June 3, 1969 E. FELDTKELLER 3,448,439
METHOD AND APPARATUS FOR ELIMINATING INTERFERENCE OUTPUT SIGNALS IN A MEMORY STORER
Filed March 31, 1965
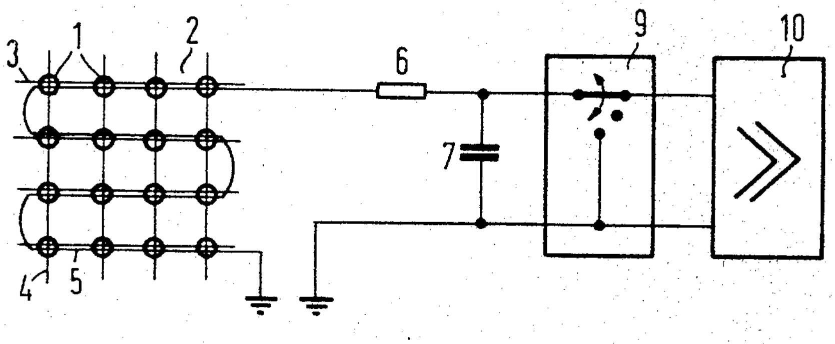
Inventor
Ernst Feldtkeller
by S Tiee & Stiee
Attys.

United States Patent Office 3,448,439
Patented June 3, 1969

3,448,439

METHOD AND APPARATUS FOR ELIMINATING INTERFERENCE OUTPUT SIGNALS IN A MEMORY STORER

Ernst Feldtkeller, Munich, Germany, assignor to Siemens Aktiengesellschaft, a corporation of Germany Filed Mar. 31, 1965, Ser. No. 444,210
Claims priority, application Germany, Apr. 3, 1964, S 90,367
Int. Cl. G11b *5/00;* H03k *15/04;* H01f *27/42*
U.S. Cl. 340—174 2 Claims

ABSTRACT OF THE DISCLOSURE

A method and apparatus for effecting the suppression of bipolar output interference impulses which arise in coincidence reading of a memory storer implying magnetic layers, actuatable through the reversible rotary processes of the partially controlled thin magnetic layers, in which, following the reading out of selected impulses, such impulses are integrated and upon the voltage of the integrated pulses reaching a predetermined value approaching a maximum value, the integrated impulse is applied to and amplified, the apparatus illustrated employing switching means disposed between the integrating means and the amplifying means to selectively apply the integrated pulse to the amplifying means.

THE DISCLOSURE

The invention relates to a process for the suppression of interference impulses released in the coincidence reading of a parallel-field and, in particular, of an orthogonal-field storer such as may occur through reversible rotary processes of the partially controlled magnetic thin-layer storage elements. In an orthogonal field storer with axially parallel field system, for example, the selection of the stored information is accomplished by coincidence of two magnetic control fields which, individually, are respectively directed parallel to the easy and to the hard axes of magnetization. On interrogation or reading of the binary digital there takes place a renewal or flipping of the magnetization—that is, the magnetization is turned out of the direction of the positive easy magnetic axis and falls finally, on switching off of the control fields, into the direction of the negative easy magnetic axis. In this connection there develops a unipolar signal which is fed out over the reading line to the reading amplifier.

In the grouping or combining of the individual memory storage elements into whole storage matrices there results an unavoidable partial control of the memory elements connected over the common reading line with the fully controlled memory element, which has as a result the previously controlled memory element, which has as a result the previously mentioned interference impulses of bipolar character.

As already mentioned, the present invention has as its object the production of a method which makes it possible to suppress or to compensate all the bipolar interference impulses or interference signals released by partial control of memory storers, for example, of thin magnetic layer storers.

For this purpose the invention provides, in a method for the compensation of bipolar output signals which arise in the coincident reading of a memory storer built up, for example, of thin magnetic layers, that the bipolar output impulses are integrated. The integral of the bipolar impulses generated by partial control of the individual elements thus becomes zero, so that after the integration only the impulse or the reading signal of the fully controlled memory element arrives at the reading amplifier. The precondition for this is, of course, that the information content corresponds to an irreversible remagnetization and thereby leads to a unipolar impulse. The process according to the invention is obviously not limited to magnetic storers and is also utilizable in ferrite core storers.

In the drawing there is schematically represented a possible form of apparatus for the execution of the process of the invention.

The figure shows a memory storage matrix 2 built up of individual memory elements 1, with correspondingly arranged writing and reading lines 3 to 5. The reading line 5 has electrically connected to it at its outlet side an integrator, constructed in the form of an RC member 6, 7. This, in turn, is conductively connected electrically with the reading amplifier 10 over an electronic switch 9 (represented only schematically). A detailed consideration of the manner of operation of this apparatus, in view of its known construction, should be unnecessary. It may be merely pointed out briefly that the electronic switch 9 applies the integrated signal voltage to the amplifier input only following the end of the unipolar reading impulse build up of the charge on the capacitor and thus results in the application of substantially the full integrated voltage to the reading amplifier upon discharge of the capacitor.

Changes may be made within the scope and spirit of the appended claims which define what is believed to be new and desired to have protected by Letters Patent.

I claim:

1. A method for the suppression of bipolar output interference impulses in coincident reading of a memory storer comprising a plurality of storage cells, each in the form of thin magnetic layers actuatable through the reversible rotary processes of the partially controlled thin magnetic layers, comprising the steps of storing the desired impulses, coincidentally reading out a selected impulse, integrating the coincidentally read out impulse, and subsequently effecting an amplification of the integrated impulses only after the voltage thereof has reached a predetermined value approaching its maximum value.

2. An apparatus for the suppression of bipolar output interference impulses which arise in coincident reading of a memory storer, comprising a memory storer having a plurality of storage cells, means for entering the desired impulses in said storer, read out means including a read out line common to a plurality of storage cells, means connected to said common read out line for integrating the pulses read out, means for amplifying the integrated impulses, and switching means disposed between and operatively connecting said integrating means and said amplifying means operable to apply the integrated signal voltage to the amplifier only after such voltage has reached a predetermined value approaching its maximum value.

References Cited

UNITED STATES PATENTS

| | | | |
|---|---|---|---|
| 2,819,456 | 1/1958 | Stuart-Williams | 340—174 |
| 3,121,172 | 2/1964 | Mintzer | 307—314 X |
| 3,328,779 | 6/1967 | Van Der Steeg et al. | 340—174 |

BERNARD KONICK, *Primary Examiner.*

JOSEPH F. BREIMAYER, *Assistant Examiner.*

U.S. Cl. X.R.

307—88